US011273869B2

(12) United States Patent
Kawai et al.

(10) Patent No.: US 11,273,869 B2
(45) Date of Patent: Mar. 15, 2022

(54) SUBFRAME FOR VEHICLE

(71) Applicants:F-TECH INC., Kuki (JP); Honda Motor Co., Ltd., Tokyo (JP)

(72) Inventors: Toru Kawai, Tochigi (JP); Ryo Ikeda, Kameyama (JP); Koji Imuta, Wako (JP); Ryota Ujie, Wako (JP)

(73) Assignees: F-TECH INC., Kuki (JP); HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 16/829,405

(22) Filed: Mar. 25, 2020

(65) Prior Publication Data

US 2020/0307703 A1    Oct. 1, 2020

(30) Foreign Application Priority Data

Mar. 29, 2019  (JP) .............................. JP2019-068075

(51) Int. Cl.
*B62D 21/15* (2006.01)
*B62D 21/11* (2006.01)
*B62D 21/02* (2006.01)

(52) U.S. Cl.
CPC ............ *B62D 21/155* (2013.01); *B62D 21/02* (2013.01); *B62D 21/11* (2013.01); *B62D 21/157* (2013.01)

(58) Field of Classification Search
CPC ...... B62D 21/155; B62D 21/11; B62D 21/02; B62D 21/157
USPC ...................................... 296/187.09
See application file for complete search history.

(56) References Cited

U.S. PATENT DOCUMENTS 9,067,627 B2 *  6/2015  Hara ................... B62D 21/152
10,118,643 B2 * 11/2018  Komiya ................. B60K 5/12

FOREIGN PATENT DOCUMENTS

EP           2477875 B1    8/2013
WO       2011032631 A1    3/2011

* cited by examiner

*Primary Examiner* — Joseph D. Pape
*Assistant Examiner* — Dana D Ivey
(74) *Attorney, Agent, or Firm* — Westerman, Hattori, Daniels & Adrian, LLP (57) ABSTRACT

A vehicle subframe attached to a vehicle body includes a first side member and a second side member that extend in a front-rear direction of a vehicle body and are arranged to be opposed to each other in a width direction of the vehicle body, a cross member that is arranged to extend in the width direction and couples the first side member and the second side member to each other, and a coupling member that is arranged to extend in the width direction to be apart from the cross member toward a rear side of the vehicle body and couples the first side member and the second side member to each other.

6 Claims, 6 Drawing Sheets

SUBFRAME FOR VEHICLE

BACKGROUND OF THE INVENTION

The present invention relates to a vehicle subframe and particularly relates to a vehicle subframe that supports components such as a driving source and a chassis, including various accessories, and is attached to a vehicle such as an automobile.

In recent years, a subframe attached to a vehicle such as an automobile is expected to be deformed in a desired deformation mode, that is, to exhibit a required collision performance typically in frontal collision of the vehicle to which the subframe is attached, in order to absorb a part of a kinetic energy applied to the vehicle in the collision, considering a portion where that deformation is actively allowed and a portion where that deformation is not allowed.

Further, various external-force application parts are attached to such a subframe, which include a driving source such as an internal combustion engine and an electric motor, driving-source-related parts, suspension-related parts such as a suspension arm and a stabilizer, steering-related parts such as a steering gear box, and a mount-related parts for an engine and transmission system.

Therefore, such a subframe is expected to be attached to a body of the vehicle, while the productivity or the like is improved and the strength and the rigidity are further increased.

Under such circumstances, European Patent Application Publication No. 2477875 relates to an automobile subframe, is directed to achieving an inexpensive and lightweight subframe having mechanical characteristics suitable during driving and at the time of collision, and discloses a configuration including two longitudinal members 11 and a single-shell stiffener 13 that extends between a cross member 12 and the longitudinal members 11. The stiffener 13 includes two longitudinal struts 20 and two transverse struts 21 that form an outer frame having a rectangular shape. The two longitudinal struts 20 each have a predetermined bending point 26.

SUMMARY OF THE INVENTION

However, the studies of the present inventor have revealed that, in the configuration in European Patent Application Publication No. 2477875, the configuration of the stiffener 13 itself is large-scale and complicated because the predetermined bending point 26 is formed in each of the two longitudinal struts 20. Therefore, the disclosed configuration has room for improvement in this regard.

Further, European Patent Application Publication No. 2477875 fails to disclose or suggest any detailed configuration regarding the two longitudinal members 11 considering a collision performance and a way of attaching the stiffener 13 to those members 11.

The present invention has been made as a result of the above studies, and it is an object of the present invention to provide a vehicle subframe capable of increasing the strength and the rigidity and exhibiting a required collision performance.

In order to achieve the above object, a first aspect of the present invention provides a vehicle subframe attached to a vehicle body, comprising: a first side member and a second side member that extend in a front-rear direction of the vehicle body and are arranged to be opposed to each other in a width direction of the vehicle body; a cross member that is arranged to extend in the width direction and couples the first side member and the second side member to each other; and a coupling member that is arranged to extend in the width direction to be apart from the cross member toward a rear side of the vehicle body and couples the first side member and the second side member to each other, wherein the coupling member is coupled to the first side member in a left front coupling portion and a left rear coupling portion that are arranged in the first side member to be apart from each other in the front-rear direction, and is coupled to the second side member in a right front coupling portion and a right rear coupling portion that are arranged in the second side member to be apart from each other in the front-rear direction, the first side member has a first fragile portion arranged between the left front coupling portion and the left rear coupling portion in the front-rear direction, and the second side member has a second fragile portion arranged between the right front coupling portion and the right rear coupling portion in the front-rear direction.

According to a second aspect of the present invention, in addition to the first aspect, the coupling member has a crossing portion where the coupling member crosses, between the first side member and the second side member, and has a third fragile portion in the crossing portion.

According to a third aspect of the present invention, in addition to the second aspect, positions in the front-rear direction at which the first fragile portion, the second fragile portion, and the third fragile portion are arranged, respectively, are arranged to be equal to each other.

According to a fourth aspect of the present invention, in addition to the third aspect, the first side member further has a fourth fragile portion on a front side in the vehicle body of the left front coupling portion, and a fifth fragile portion on the rear side of the left rear coupling portion, and the second side member further has a sixth fragile portion on the front side of the right front coupling portion and a seventh fragile portion on the rear side of the right rear coupling portion.

According to a fifth aspect of the present invention, in addition to the second aspect, the third fragile portion is formed as a concave portion that is concave downward in the vehicle body.

According to a sixth aspect of the present invention, in addition to the second aspect, the coupling member is inclined downward in the vehicle body as the coupling member approaches the crossing portion from the first side member and the second side member.

In the configuration according to the first aspect of the present invention, a vehicle subframe includes a first side member and a second side member that extend in a front-rear direction of a vehicle body and are arranged to be opposed to each other in a width direction of the vehicle body, a cross member that is arranged to extend in the width direction and couples the first side member and the second side member to each other, and a coupling member that is arranged to extend in the width direction to be apart from the cross member toward a rear side of the vehicle body and couples the first side member and the second side member to each other. The coupling member is coupled to the first side member in a left front coupling portion and a left rear coupling portion that are arranged in the first side member to be apart from each other in the front-rear direction, and is coupled to the second side member in a right front coupling portion and a right rear coupling portion that are arranged in the second side member to be apart from each other in the front-rear direction. The first side member has a first fragile portion arranged between the left front coupling portion and the left rear coupling portion in the front-rear direction. The second side member has a second fragile portion arranged between the right front coupling portion and the right rear coupling portion in the front-rear direction. Therefore, it is possible to increase the strength and the rigidity of the vehicle subframe by the coupling member, and to appropriately arrange the first fragile portion and the second fragile portion with respect to the coupling portions of the coupling member, thereby allowing the vehicle subframe to exhibit a required collision performance.

In the configuration according to the second aspect of the present invention, the coupling member has a crossing portion where the coupling member crosses, between the first side member and the second side member, and has a third fragile portion in the crossing portion. Therefore, it is possible to increase the strength and the rigidity of the vehicle subframe by forming the coupling member as a diagonal bracing structure, and to arrange the third fragile portion of the coupling member in such a manner that the coupling member does not unnecessarily affect deformation modes of the first fragile portion and the second fragile portion, thereby allowing deformation of the first fragile portion and the second fragile portion and allowing the vehicle subframe to exhibit the required collision performance.

In the configuration according to the third aspect of the present invention, positions in the front-rear direction at which the first fragile portion, the second fragile portion, and the third fragile portion are respectively arranged are arranged to be equal to each other. Therefore, when the first fragile portion and the second fragile portion are deformed in collision of a vehicle, the third fragile portion is also deformed, and it is possible to allow the vehicle subframe to exhibit the required collision performance while timings of deformation of those fragile portions are made substantially the same as each other.

In the configuration according to the fourth aspect of the present invention, the first side member further has a fourth fragile portion on a front side in the vehicle body of the left front coupling portion and a fifth fragile portion on the rear side of the left rear coupling portion, and the second side member further has a sixth fragile portion on the front side of the right front coupling portion and a seventh fragile portion on the rear side of the right rear coupling portion. Therefore, it is possible to promote deformation of the first fragile portion and the second fragile portion by the fourth, fifth, sixth, and seventh fragile portions in an auxiliary manner, thereby allowing the vehicle subframe to exhibit the required collision performance.

In the configuration according to the fifth aspect of the present invention, the third fragile portion is formed as a concave portion that is concave downward. Therefore, it is possible to increase the strength and the rigidity of the vehicle subframe by forming the coupling member as a diagonal bracing structure. Also, it is possible to arrange the third fragile portion of the coupling member to more effectively prevent the coupling member from unnecessarily affecting the deformation modes of the first fragile portion and the second fragile portion, thereby allowing deformation thereof and allowing the vehicle subframe to exhibit the required collision performance.

In the configuration according to the sixth aspect of the present invention, the coupling member is inclined downward as it approaches the crossing portion from the first side member and the second side member. Therefore, it is possible to increase the strength and the rigidity of the vehicle subframe by forming the coupling member as a diagonal bracing structure, and to arrange the third fragile portion of the coupling member to more effectively prevent the coupling member from unnecessarily affecting the deformation modes of the first fragile portion and the second fragile portion, thereby allowing deformation thereof and allowing the vehicle subframe to exhibit the required collision performance. Further, because the coupling member is inclined downward, it is possible to ensure a space above the vehicle subframe and to improve the layout property of a peripheral member.

DETAILED DESCRIPTION OF THE PREFERRED EMBODIMENT

A vehicle subframe according to an embodiment of the present invention will be explained below in detail with reference to FIGS. 1 to 5. In the drawings, an x-axis, a y-axis, and a z-axis form a triaxial orthogonal coordinate system, and descriptions are made assuming the positive direction of the x-axis as a left direction, the positive direction of the y-axis as a front direction, and the positive direction of the z-axis as an upper direction. An x-axis direction is referred to as a width direction or a lateral direction, a y-axis direction is referred to as a front-rear direction, and a z-axis direction is referred to as a vertical direction in some cases.

Figure 1:
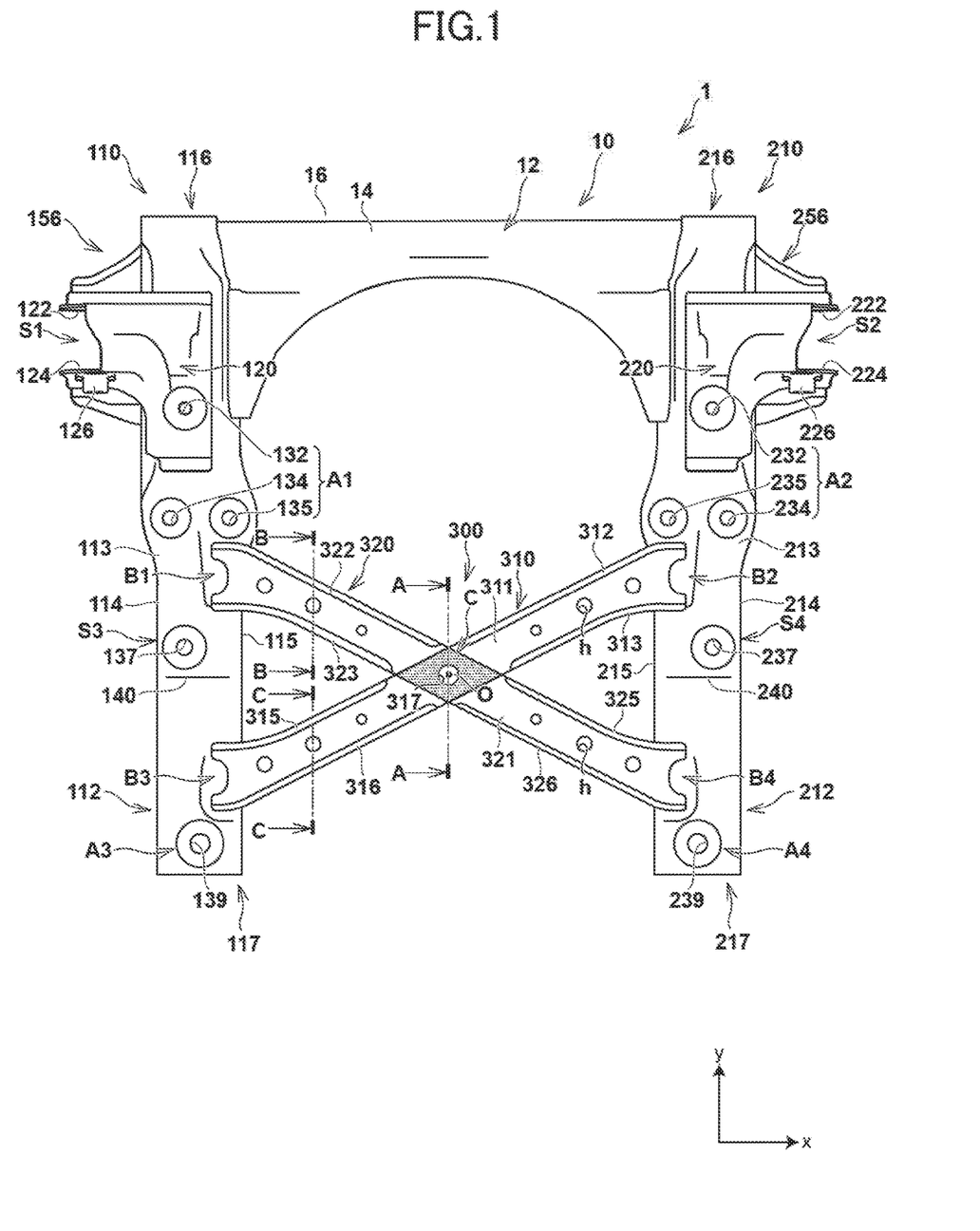
FIG. 1 is a plan view showing a configuration of a vehicle subframe according to an embodiment of the present invention.
Figure 2:
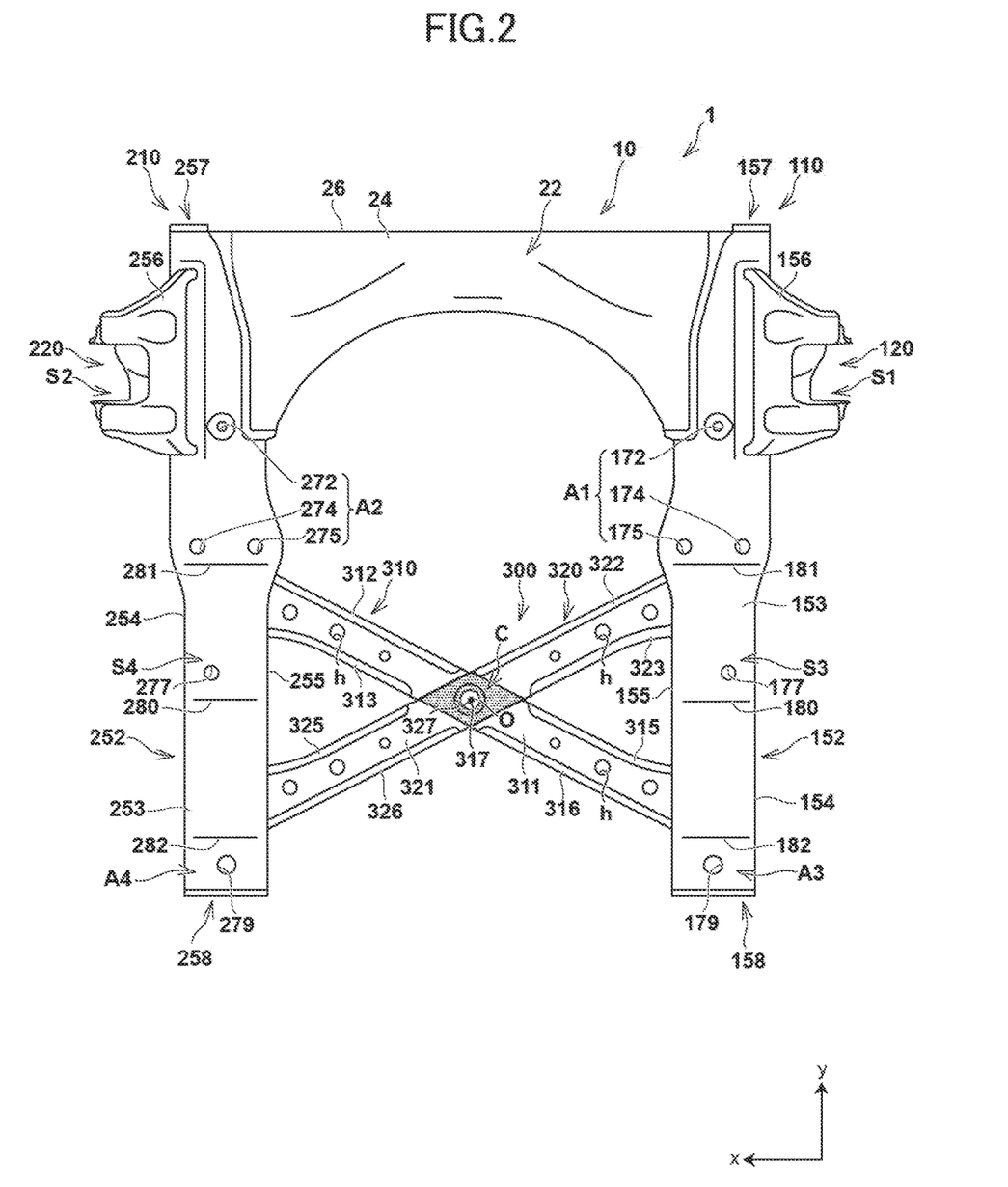
FIG. 2 is a bottom view showing the configuration of the vehicle subframe according to the present embodiment.
Figure 3:
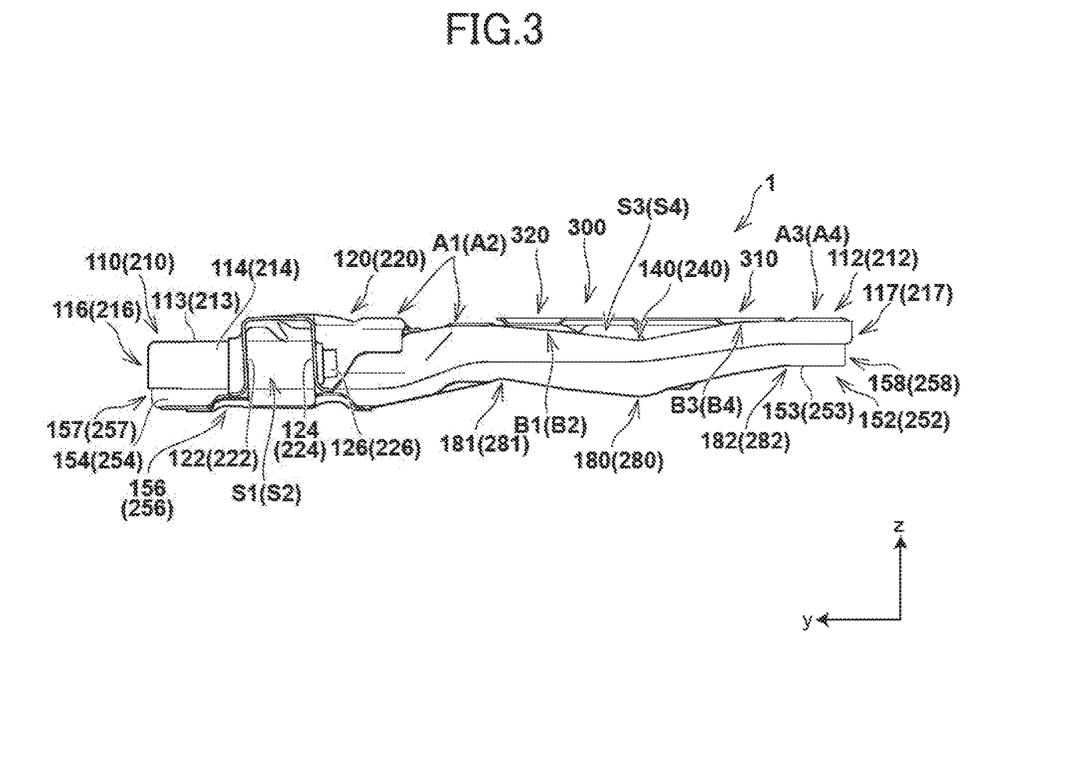
FIG. 3 is a left side view showing the configuration of the vehicle subframe according to the present embodiment.
Figure 4A:
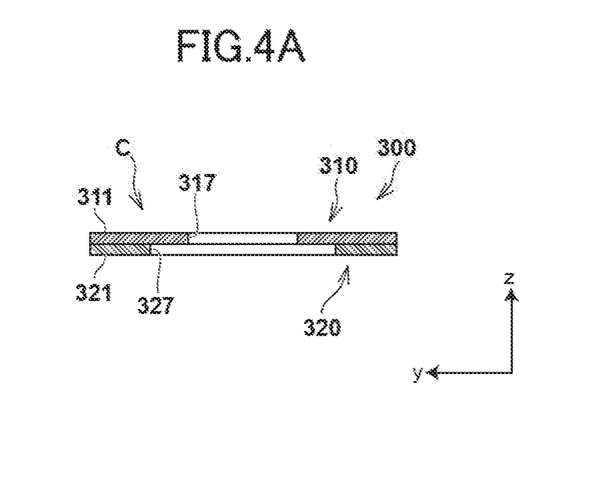
FIG. 4A is a cross-sectional view taken along a line A-A in FIG. 1.
Figure 4B:
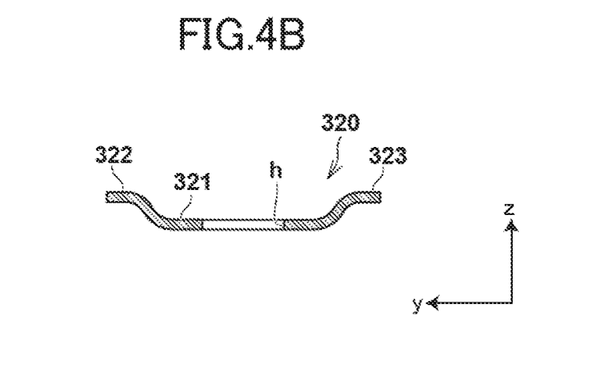
FIG. 4B is a cross-sectional view taken along a line B-B in FIG. 1.
Figure 4C:
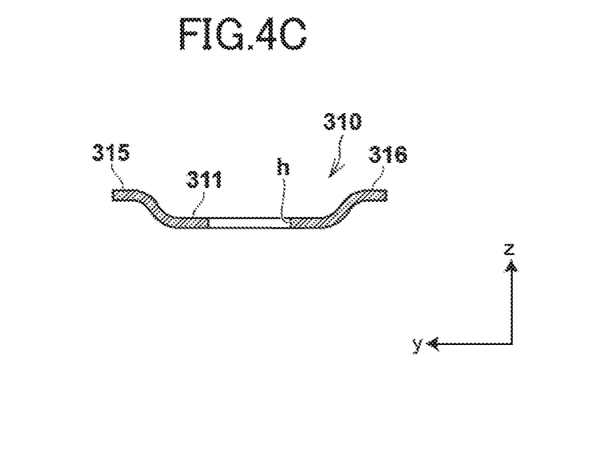
FIG. 4C is a cross-sectional view taken along a line C-C in FIG. 1.
Figure 5:
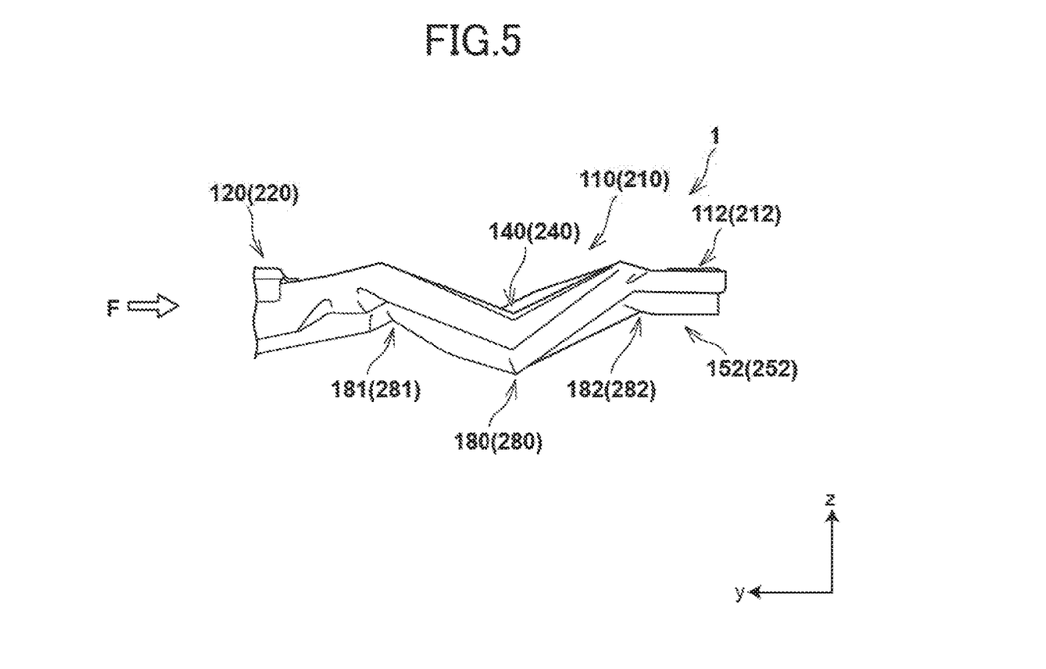
FIG. 5 is a partial left side view schematically showing a configuration of the vehicle subframe according to the present embodiment in collision.

FIGS. 1 to 3 are a plan view, a bottom view, and a left side view showing a configuration of a vehicle subframe according to the present embodiment, respectively. FIG. 4A is a cross-sectional view taken along a line A-A in FIG. 1, FIG. 4B is a cross-sectional view taken along a line B-B in FIG. 1, FIG. 4C is a cross-sectional view taken along a line C-C in FIG. 1, and each of FIG. 4 is a longitudinal cross-sectional view taken along a plane parallel to a y-z plane formed by the y-axis and the z-axis. FIG. is a partial left side view schematically showing a configuration of the vehicle subframe according to the present embodiment in collision. In FIGS. 3 to 5, reference signs for a part of constituent elements in a right portion of the vehicle subframe are written in parenthesis together with reference signs for constituent elements in a left portion as necessary, for convenience of description.

As shown mainly in FIGS. 1 to 4C, a subframe 1 supports a suspension arm and the like while being attached to a vehicle body such as a front side frame that defines a front engine bay of a vehicle such as an automobile, although those are not shown. The subframe 1 typically has a symmetrical (plane-symmetrical) shape with respect to a plane that is parallel to a y-z plane and passes through the center line extending in a front-rear direction in the center in a width direction of the vehicle body.

In the subframe 1, four attachment portions including a first vehicle-body attachment portion A1, a second vehicle-body attachment portion A2, a third vehicle-body attachment portion A3, and a fourth vehicle-body attachment portion A4 are arranged as portions attached to the vehicle body, and four supporting portions including a first supporting portion S1, a second supporting portion S2, a third supporting portion S3, and a fourth supporting portion S4 are arranged as portions that support the suspension arm, although the details of the above-listed portions will be described later.

Specifically, the subframe 1 mainly includes a cross member arranged to extend in the width direction, a pair of side members including a left side member 110 and a right side member 210 that are coupled to the cross member 10, extend in the front-rear direction, and are arranged to be opposed to each other in the width direction, a left supporting member 120 arranged on the left of the left side member 110, a right supporting member 220 arranged on the right of the right side member 210, and a coupling member 300 that is arranged on the rear side of the cross member 10 and is coupled to the left side member 110 and the right side member 210. These members are each typically obtained by press-forming of one flat-plate member such as a steel plate. Overlapped portions and butted portions of these members are welded by arc welding or the like to be integrated with each other while being in contact with each other in a corresponding manner, so that the subframe 1 has a closed-section shape basically. Each of these members can be replaced with any of a tubular member, a cast member, and a molded member of synthetic resin as necessary. In that case, the form of connection between the members can be replaced with mechanical connection using a bolt, a nut, or the like, bonding using an adhesive or the like, and joint connection using a physical property change in an interface region between the members.

The cross member 10 includes a transverse upper member 12 that extends in the width direction and a transverse lower member 22 that is arranged below the transverse upper member 12 to be opposed thereto, extends in the width direction, and is integrated with the transverse upper member 12 by being welded typically by arc welding or the like.

Specifically, the transverse upper member 12 is a plate member that closes the top and the front of the cross member 10, and has an upper wall portion 14 and a front vertical wall portion 16. The upper wall portion 14 and the front vertical wall portion 16 are provided to extend over the entire length in the width direction of the transverse upper member 12, and close the top and the front of the cross member 10 to correspond thereto.

The transverse lower member 22 is a plate member that closes the bottom and the front of the cross member 10, and has a bottom wall portion 24 and a front vertical wall portion 26. The bottom wall portion 24 and the front vertical wall portion 26 are provided to extend over the entire length in the width direction of the transverse lower member 22, and close the bottom and the front of the cross member 10 to correspond thereto. A rear end of the upper wall portion 14 of the transverse upper member 12 and a rear end of the bottom wall portion 24 of the transverse lower member 22 are welded typically by arc welding or the like to correspond to each other. A lower end of the front vertical wall portion 16 of the transverse upper member 12 and an upper end of the front vertical wall portion 26 of the transverse lower member 22 are welded typically by arc welding or the like to correspond to each other. The rear end of the upper wall portion 14 of the transverse upper member 12 and the rear end of the bottom wall portion 24 of the transverse lower member 22 are preferably concave to the front in a top view, especially from a viewpoint of increasing the volume of an inner region of the subframe 1 surrounded by the cross member 10, the left side member 110, and the right side member 210 while the strength and the rigidity of the subframe 1 are increased, for example.

The left side member 110 includes a left upper member 112 that is a plate member being basically convex upward and extending in the front-rear direction in a left portion thereof, and a left lower member 152 that is a plate member being arranged below the left upper member 112 to be opposed thereto, being basically convex downward, and extending in the front-rear direction. The left upper member 112 and the left lower member 152 are integrated with each other by being welded typically by arc welding or the like in a corresponding manner.

Specifically, the left upper member 112 is a plate member that closes the top and both sides in the width direction of the left side member 110, and has an upper wall portion 113, an outer wall portion 114, and an inner wall portion 115. The upper wall portion 113, the outer wall portion 114, and the inner wall portion 115 are provided to extend over the entire length in the front-rear direction of the left upper member 112, and close the top and the outer and inner sides in the width direction of the left upper member 112 to correspond thereto, respectively.

The upper wall portion 113 has through holes 132, 134, 135, 137, and 139 that penetrate through the upper wall portion 113 and a concave portion 140 in which the upper wall portion 113 is dented downward, between a front end 116 and a rear end 117 of the left upper member 112.

A fastening member that allows an attaching bracket (not shown) for attaching the subframe 1 to a vehicle body to be attached, such as a bolt, is inserted into each of the through holes 132, 134, and 135. The number of these through holes may be less than three or four or more as necessary. From a viewpoint of improving the rigidity of supporting the attaching bracket, for example, it is preferable that at least one of those through holes (only the front-most through hole 132 in FIG. 1) penetrates not only through the upper wall portion 113 but also through the left supporting member 120.

The through hole 137 is arranged on the rear side of the through holes 132, 134, and 135. A fastening member that allows an attaching bracket (not shown) for allowing an inner rear pivot portion of a left suspension member (not shown) to be attached and supporting the inner rear pivot portion to be attached, such as a bolt, is inserted into the through hole 137. The through hole 139 is arranged on the rear side of the through hole 137. A fastening member for attaching the subframe 1 to a vehicle body, such as a bolt is inserted into the through hole 139.

In the concave portion 140, an area of a longitudinal section of the left side member 110 taken along a plane parallel to an x-z plane is reduced. The concave portion 140 functions as a fragile portion that is deformed in a required deformation mode in which it is bent mainly downward by an impact applied to the front end 116 typically in frontal collision of a vehicle. Further, in the concave portion 140, a longitudinal section of the left side member 110 taken along a plane parallel to a y-z plane is a triangle with its vertex facing downward. The concave portion 140 is arranged at a position that does not interfere with the through holes 132, 134, 135, 137, and 139 (a position between the through holes 137 and 139 in the front-rear direction in FIG. 1).

The left supporting member 120 is arranged on the upper wall portion 113 and the outer wall portion 114, and is integrated therewith by being welded typically by arc welding or the like in a corresponding manner. The left supporting member 120 has a front supporting wall portion 122 and a rear supporting wall portion 124 opposed to each other in the front-rear direction. The front supporting wall portion 122 and the rear supporting wall portion 124 are each a supporting portion that allows an inner front pivot portion of a left suspension member (not shown) to be attached thereto and supports it. The front supporting wall portion 122 has a through hole (not shown), and the rear supporting wall portion 124 has a through hole (not shown) and a nut 126 that correspond to the through hole in the front supporting wall portion 122. A fastening member for attaching the inner front pivot portion of the left suspension member, such as a bolt is fastened to the nut 126 via those opposed through holes.

The upper wall portion 14 and the front vertical wall portion 16 of the transverse upper member 12 of the cross member 10 are welded to the upper wall portion 113 and the inner wall portion 115 to correspond thereto, respectively, typically by arc welding or the like, so that the cross member 10 and the left side member 110 are integrated with each other. From a viewpoint of improving the rigidity of supporting the front supporting wall portion 122 and the rear supporting wall portion 124 of the left supporting member 120, for example, it is preferable that the front supporting wall portion 122 and the rear supporting wall portion 124, and the upper wall portion 14 of the transverse upper member 12 of the cross member 10 are opposed to each other in the width direction via the upper wall portion 113 and the inner wall portion 115. Further, from a viewpoint of improving the rigidity of supporting an attaching bracket (not shown) for attaching the subframe 1 to a vehicle body, for example, the rear end of the upper wall portion 14 of the transverse upper member 12 may extend more to the rear, and at least one of the through holes 132, 134, and 135 may be opposed to the upper wall portion 14 of the transverse upper member 12 of the cross member 10 in the width direction.

The left lower member 152 is a plate member that closes the bottom and both sides in the width direction of the left side member 110, and has a bottom wall portion 153, an outer wall portion 154, and an inner wall portion 155. The bottom wall portion 153, the outer wall portion 154, and the inner wall portion 155 are provided to extend over the entire length in the front-rear direction of the left lower member 152, and close the bottom and the outer and inner sides in the width direction of the left lower member 152 to correspond thereto, respectively.

The bottom wall portion 153 has through holes 172, 174, 175, 177, and 179 that penetrate therethrough between a front end 157 and a rear end 158 of the left lower member 152. The bottom wall portion 153 may have a convex portion 180 in which the bottom wall portion 153 projects downward and a front concave portion 181 and a rear concave portion 182 in each of which the bottom wall portion 153 is dented upward, between the front end 157 and the rear end 158 of the left lower member 152 as necessary.

The through holes 172, 174, 175, 177, and 179 are arranged below the through holes 132, 134, 135, 137, and 139 of the left upper member 112 to be opposed thereto, respectively. A fastening member such as a bolt that is applied to each of the through holes 132, 134, and 135 is inserted to the corresponding through hole 172, 174, or 175. The through hole 177 is arranged on the rear side of the through holes 172, 174, and 175. A fastening member such as a bolt that is applied to the through hole 137 is inserted into the through hole 177. The through hole 179 is arranged on the rear side of the through hole 177. A fastening member such as a bolt that is applied to the through hole 139 is inserted into the through hole 179. Collar members made of metal or the like, may be interposed between the through holes 132, 134, 135, 137, and 139 of the left upper member 112, and the through holes 172, 174, 175, 177, and 179 of the left lower member 152 in a corresponding manner.

The convex portion 180 and also the front concave portion 181 and the rear concave portion 182 that are arranged on the front side and the rear side of the convex portion 180, respectively, to sandwich the convex portion 180 therebetween in the front-rear direction, assist a function of the concave portion 140 of the left upper member 112 as a fragile portion. When the concave portion 140 of the left upper member 112 is deformed in a required deformation mode in which it is bent mainly downward by an impact applied to the front end 116 typically in frontal collision of a vehicle, all the convex portion 180, the front concave portion 181, and the rear concave portion 182 are deformed to promote the deformation of the concave portion 140, so that the convex portion 180 functions as a fragile portion together with the concave portion 140, the front concave portion 181 functions as a front fragile portion arranged on the front side of the fragile portion formed by the concave portion 140 and the convex portion 180, and the rear concave portion 182 functions as a rear fragile portion arranged on the rear side of the fragile portion formed by the concave portion 140 and the convex portion 180. That is, by an impact applied to the front end 157 typically in frontal collision of a vehicle, the convex portion 180 is deformed in a required deformation mode in which it is bent mainly downward, and the front concave portion 181 and the rear concave portion 182 are each deformed in a required deformation mode in which it is bent mainly upward. It suffices that the convex portion 180 is a triangle with its vertex facing downward in a longitudinal section of the left side member 110 taken along a plane parallel to a y-z plane, and is arranged below the concave portion 140 of the left lower member 112 to be opposed thereto. Further, it suffices that the front concave portion 181 is arranged on a portion which is on the rear side of the through holes 174 and 175 and on the front side of the convex portion 180, the rear concave portion 182 is arranged on a portion which is on the rear side of the convex portion 180 and on the front side of the through hole 177, and typically, each of the front concave portion 181 and the rear concave portion 182 is a triangle with its vertex facing upward in a longitudinal section of the left side member 110 taken along a plane parallel to a y-z plane.

A left reinforcing member 156 is arranged on the bottom wall portion 153 and the outer wall portion 154, which is arranged below the left supporting member 120 of the left upper member 112, is integrated with the left supporting member 120, the bottom wall portion 153, and the outer wall portion 154 by being welded typically by arc welding or the like, and reinforces the left supporting member 120.

The bottom wall portion 24 and the front vertical wall portion 26 of the transverse lower member 22 of the cross member 10 are welded to the bottom wall portion 153 and the inner wall portion 155 to correspond thereto typically by arc welding or the like, respectively, so that the cross member 10 and the left side member 110 are integrated with each other. Further, from a viewpoint of improving the rigidity of supporting an attaching bracket (not shown) for attaching the subframe 1 to a vehicle body, for example, the rear end of the bottom wall portion 24 of the transverse lower member 22 may extend more to the rear, and at least one of the through holes 172, 174, and 175 and the bottom wall portion 24 of the transverse lower member 22 of the cross member 10 are opposed to each other in the width direction.

The configuration related to the right side member 210 arranged on the right of the left side member 110 to be opposed thereto in the width direction is basically symmetrical with the configuration related to the left side member 110 with respect to a plane that is parallel to a y-z plane and passes through the center line extending in the front-rear direction in the center in the width direction of the vehicle body, and therefore the detailed descriptions thereof are omitted. The configuration related to the right side member 210 includes a right upper member 212 of the right side member 210, an upper wall portion 213, an outer wall portion 214, an inner wall portion 215, a front end 216, a rear end 217, the right supporting member 220, a front supporting wall portion 222, a rear supporting wall portion 224, a nut 226, through holes 232, 234, 235, 237, and 239 and a concave portion 240 of the right upper member 212, a right lower member 252 of the right side member 210, a bottom wall portion 253, an outer wall portion 254, an inner wall portion 255, a right reinforcing member 256, a front end 257, a rear end 258, through holes 272, 274, 275, 277, and 279, a convex portion 280, and a front concave portion 281 and a rear concave portion 282 of the right lower member 252 to respectively correspond to the left upper member 112 of the left side member 110, the upper wall portion 113, the outer wall portion 114, the inner wall portion 115, the front end 116, the rear end 117, the left supporting member 120, the front supporting wall portion 122, the rear supporting wall portion 124, the nut 126, the through holes 132, 134, 135, 137, and 139 and the concave portion 140 of the left upper member 112, the left lower member 152 of the left side member 110, the bottom wall portion 153, the outer wall portion 154, the inner wall portion 155, the left reinforcing member 156, the front end 157, the rear end 158, the through holes 172, 174, 175, 177, and 179, the convex portion 180, and the front concave portion 181 and the rear concave portion 182 of the left lower member 152. The front and rear ends 116, 157, 216, 257, 117, 158, 217, and 258 of the left side member 110 and the right side member 210 may be closed, for example, by bending the upper wall portions 113 and 213 or the bottom wall portions 153 and 253 as necessary.

On the rear side of the cross member 10, the coupling member 300 is welded typically to the upper wall portion 113 of the left upper member 112 of the left side member 110 in a first coupling portion B1 and a third coupling portion B3 arranged on the rear side of the first coupling portion B1 typically by arc welding or the like in a corresponding manner, and is welded to the upper wall portion 213 of the right upper member 212 of the right side member 210 in a second coupling portion B2 and a fourth coupling portion B4 arranged on the rear side of the second coupling portion B2 typically by arc welding or the like in a corresponding manner, to extend between the left side member 110 and the right side member 210 and couple them to each other. Further, in order not to unnecessarily affect deformation modes caused by the concave portion 140 provided in the upper wall portion 113 of the left upper member 112 and the concave portion 240 provided in the upper wall portion 213 of the right upper member 212 that are provided to function as fragile portions typically in frontal collision of a vehicle, the first coupling portion B1 and the third coupling portion B3 are arranged on the front side of the concave portion 140 and on the rear side of the concave portion 140 to sandwich the concave portion 140 therebetween in a corresponding manner, and the second coupling portion B2 and the fourth coupling portion B4 are arranged on the front side of the concave portion 240 and on the rear side of the concave portion 240 to sandwich the concave portion 240 therebetween in a corresponding manner. At this time, in FIG. 1, regarding the left upper member 112, the first coupling portion B1, the through hole 137, the concave portion 140, the third coupling portion B3, and the through hole 139 are arranged on the rear side of the through holes 134 and 135 in the front-rear direction in this order from the front to the rear. In FIG. 2, regarding the left lower member 152, the front concave portion 181, the first coupling portion B1 (arranged in the left upper member 112), the through hole 177, the convex portion 180, the third coupling portion B3 (arranged in the left upper member 112), the rear concave portion 182, and the through hole 179 are arranged on the rear side of the through holes 174 and 175 in this order from the front to the rear. In FIG. 1, regarding the right upper member 212, the second coupling portion B2, the through hole 237, the concave portion 240, the fourth coupling portion B4, and the through hole 239 are arranged on the rear side of the through holes 234 and 235 in this order from the front to the rear. In FIG. 2, regarding the right lower member 252, the front concave portion 281, the second coupling portion B2 (arranged in the right upper member 212), the through hole 277, the convex portion 280, the fourth coupling portion B4 (arranged in the right upper member 212), the rear concave portion 282, and the through hole 279 are arranged on the rear side of the through holes 274 and 275 in this order from the front to the rear.

The coupling member 300 may be one plate member shaped by press-forming or the like of one flat-plate base material, for example. When improvement of the supporting rigidity between the left side member 110 and the right side member 210, weight reduction of the coupling member 300, improvement of the yield of the base material thereof, and the like are considered comprehensively, the coupling member 300 may be configured by defining a crossing portion C at the center in the width direction between the upper wall portion 113 of the left upper member 112 and the upper wall portion 213 of the right upper member 212 and combining a first coupling member 310 and a second coupling member 320 that are press-formed products of individual plate members in a form of a diagonal bracing structure around the crossing portion C in a top view. However, from a viewpoint of improving the rigidity for an input from a suspension arm, for example, the coupling member 300 may be configured by combining press-formed products that are formed of separate plate members between the front side and the rear side of the crossing portion C. In this case, it is preferable that a joint portion where the plate members are joined to each other and the concave portions 140 and 240 are arranged at positions where these portions overlap each other in the front-rear direction when viewed from the x-axis direction.

The first coupling member 310 includes a plate-shaped main body 311 that extends between the second coupling portion B2 and the third coupling portion B3, a pair of flanges 312 and 313 that stand from the main body 311 on the right of the crossing portion C to project to directions in which the flanges 312 and 313 are apart from each other, and a pair of flanges 315 and 316 that stand from the main body 311 on the left of the crossing portion C to project to directions in which the flanges 315 and 316 are apart from each other. The second coupling member 320 includes a plate-shaped main body 321 that extends between the first coupling portion B1 and the fourth coupling portion B4, a pair of flanges 322 and 323 that stand from the main body 321 on the left of the crossing portion C to project to directions in which the flanges 322 and 323 are apart from each other, and a pair of flanges 325 and 326 that stand from the main body 321 on the right of the crossing portion C to project to directions in which the flanges 325 and 326 are apart from each other. Further, the first coupling member 310 and the second coupling member 320 are integrated with each other by being welded typically by arc welding or the like in a corresponding manner with the main body 311 and the main body 321 overlapped up and down in the crossing portion C. In each of the first coupling member 310 and the second coupling member 320, a plurality through holes h may be formed for weight reduction.

Further, an impact is applied to the first coupling member 310 and the second coupling member 320 via the left side member 110 and the right side member 210 typically in frontal collision of a vehicle. Therefore, in order not to unnecessarily affect deformation modes of the left side member 110 and the right side member 210 mainly caused by the concave portion 140 that is provided in the upper wall portion 113 of the left upper member 112 of the left side member 110 and functions as a fragile portion and the concave portion 240 that is provided in the upper wall portion 213 of the right upper member 212 of the right side member 210 and functions as a fragile portion, it is preferable to arranged the crossing portion C as a no-flange portion by dividing the flanges 312, 313, 315, 316, 322, 323, 325, and 326 of the first coupling member 310 and the second coupling member 320 without connecting those flanges in a corresponding manner, and to arrange through holes 317 and 327 that penetrate through the main bodies 311 and 321 in a corresponding manner to obtain a fragile portion. The fragile portion in the crossing portion C may include at least one of the no-flange portion and the through holes 317 and 327, and the position of that fragile portion may be represented by the center point O of the crossing portion C in a top view. Further, in this case, the position in the front-rear direction of the center point O of the fragile portion in the crossing portion C of the first coupling member 310 and the second coupling member 320 is preferably made coincident with the positions in the front-rear direction of the concave portion 140 of the upper wall portion 113 of the left upper member 112 and the concave portion 240 of the upper wall portion 213 of the right upper member 212. In this case, the concave portion 140, the concave portion 240, and the center point O of the fragile portion in the crossing portion C in a top view are aligned in a line parallel to the width direction.

Further referring also to FIG. 5, when an impact F is applied to the front end 116 of the left upper member 112 and the front end 157 of the left lower member 152 in the left side member 110 in the above configuration typically in frontal collision of a vehicle, the concave portion 140 of the left upper member 112 is deformed in a required deformation mode in which it is bent mainly downward without being unnecessarily affected by the coupling member 300. At this time, in a case where the convex portion 180 of the left lower member 152 is provided in the left upper member 110, the convex portion 180 is deformed in a required deformation mode in which it is bent mainly downward, to be deformed to promote deformation of the concave portion 140 of the left upper member 112. Further, in a case where a fragile portion is provided in the crossing portion C of the coupling member 300, this fragile portion is also deformed, for example, is crushed and deformed, and therefore the concave portion 140 of the left upper member 112 is deformed in the required deformation mode in which it is bent mainly downward without being unnecessarily affected by the coupling member 300. Furthermore, in a case where the front concave portion 181 and the rear concave portion 182 of the left lower member 152 are provided in the left side member 110, the front concave portion 181 and the rear concave portion 182 are each deformed in a required deformation mode in which each portion is bent mainly upward, to be deformed to promote deformation of the concave portion 140 of the left upper member 112. These forms of deformation are also identical to those in a case where the impact F is applied to the front end 216 of the right upper member 212 and the front end 257 of the right lower member 252 in the right side member 210 typically in frontal collision of a vehicle.

In addition, among various points at which the subframe 1 is attached to a vehicle body in the above configuration, the through holes 132, 134, and 135 provided in the left upper member 112 of the left side member 110, the through holes 172, 174, and 175 provided in the left lower member 152 of the left side member 110, and collar members (not shown) provided to correspond thereto correspond to the left-front first vehicle-body attachment portion A1. The through holes 232, 234, and 235 provided in the right upper member 212 of the right side member 210, the through holes 272, 274, and 275 provided in the right lower member 252 of the right side member 210, and collar members (not shown) provided to correspond thereto correspond to the right-front second vehicle-body attachment portion A2. The through hole 139 provided in the left upper member 112 of the left side member 110, the through hole 179 provided in the left lower member 152 of the left side member 110, and a collar member (not shown) provided to correspond thereto correspond to the left-rear third vehicle-body attachment portion A3. The through hole 239 provided in the right upper member 212 of the right side member 210, the through hole 279 provided in the right lower member 252 of the right side member 210, and a collar member (not shown) provided to correspond thereto correspond to the right-rear fourth vehicle-body attachment portion A4. All these portions are typically portions for fastening using a fastening member such as a bolt. Further, an example is assumed in which a rigid structure without any subframe mounting member is employed for these portions. However, a floating structure using a subframe mounting member may be employed. Furthermore, although not shown, it is assumed that an attaching bracket is fastened to each of the first vehicle-body attachment portion A1 and the second vehicle-body attachment portion A2.

Among various portions at which the subframe 1 supports inner pivoting portions of a suspension arm, the front supporting wall portion 122 and the rear supporting wall portion 124 of the left supporting member 120 correspond to the left-front first supporting portion S1, the front supporting wall portion 222 and the rear supporting wall portion 224 of the right supporting member 220 correspond to the right-front second supporting portion S2, the through hole 137 provided in the left upper member 112 of the left side member 110, the through hole 177 provided in the left lower member 152 of the left side member 110, and a collar member (not shown) provided to correspond thereto correspond the left-rear third supporting portion S3, and the through hole 237 provided in the right upper member 212 of the right side member 210, the through hole 277 provided in the right lower member 252 of the right side member 210, and a collar member (not shown) provided to correspond thereto correspond to the right-rear fourth supporting portion S4. All these portions are portions for fastening typically using a fastening member such as a bolt. Further, an example is assumed in which an L-shaped lower arm is employed as the suspension arm applied to these portions. However, an A-shaped lower arm or two I-shaped lower arms may be employed. Furthermore, regarding the left-front first supporting portion S1 and the right-front second supporting portion S2, an example is assumed in which an inner cylinder of an insulator bush member (not shown) is fastened to each of the portions S1 and S2. Regarding the left-rear third supporting portion S3 and the right-rear fourth supporting portion S4, although not shown, an example is assumed in which an attaching bracket is fastened to each of the portions S3 and S4 and the insulator bush member is attached to those brackets.

In the present embodiment described above, the vehicle subframe 1 includes the first side member 110 and the second side member 210 that extend in the front-rear direction of a vehicle body and are arranged to be opposed to each other in the width direction of the vehicle body, the cross member 10 that is arranged to extend in the width direction and couples the first side member 110 and the second side member 210 to each other, and the coupling member 300 that is arranged to extend in the width direction to be apart from the cross member 10 toward the rear side of the vehicle body and couples the first side member 110 and the second side member 210 to each other. The coupling member 300 is coupled to the first side member in the left front coupling portion B1 and the left rear coupling portion B3 that are arranged in the first side member 110 to be apart from each other in the front-rear direction, and is coupled to the second side member 210 in the right front coupling portion B2 and the right rear coupling portion B4 that are arranged in the second side member 210 to be apart from each other in the front-rear direction. The first side member 110 has the first fragile portion 140 arranged between the left front coupling portion B1 and the left rear coupling portion B3 in the front-rear direction. The second side member 210 has the second fragile portion 240 arranged between the right front coupling portion B2 and the right rear coupling portion B4 in the front-rear direction. Therefore, it is possible to increase the strength and the rigidity of the vehicle subframe 1 by the coupling member 300. Also, it is possible to allow the vehicle subframe 1 to exhibit a required collision performance by appropriately arranging the first fragile portion 140 and the second fragile portion 240 with respect to the coupling portions B1 to B4 of the coupling member 300.

Further, in the present embodiment, the coupling member 300 has the crossing portion C where the coupling member 300 crosses, between the first side member 110 and the second side member 210, and has a third fragile portion in the crossing portion C. Therefore, it is possible to increase the strength and the rigidity of the vehicle subframe 1 by forming the coupling member 300 as a diagonal bracing structure, and to arrange the third fragile portion of the coupling member 300 in such a manner that the coupling member 300 does not unnecessarily affect deformation modes of the first fragile portion 140 and the second fragile portion 240, so that it is possible to allow the vehicle subframe to exhibit the required collision performance while allowing deformation of the first fragile portion 140 and the second fragile portion 240.

Further, in the present embodiment, positions in the front-rear direction at which the first fragile portion 140, the second fragile portion 240, and the third fragile portion in the crossing portion C are respectively arranged are arranged to be equal to each other. Therefore, when the first fragile portion 140 and the second fragile portion 240 are deformed in collision of the vehicle, the third fragile portion in the crossing portion C is also deformed, and it is possible to allow the vehicle subframe 1 to exhibit the required collision performance while timings of deformation of those fragile portions are made substantially the same as each other.

Furthermore, in the present embodiment, the first side member 110 further has the fourth fragile portion 181 on the front side of the left front coupling portion B1 and the fifth fragile portion 182 on the rear side of the left rear coupling portion B3, and the second side member 210 further has the sixth fragile portion 281 on the front side of the right front coupling portion B2 and the seventh fragile portion 282 on the rear side of the right rear coupling portion B4. Therefore, it is possible to promote deformation of the first fragile portion 140 and the second fragile portion 240 by the fourth fragile portion 181, the fifth fragile portion 182, the sixth fragile portion 281, and the seventh fragile portion 282 in an auxiliary manner and to allow the vehicle subframe 1 to exhibit the required collision performance.

Figure 6:
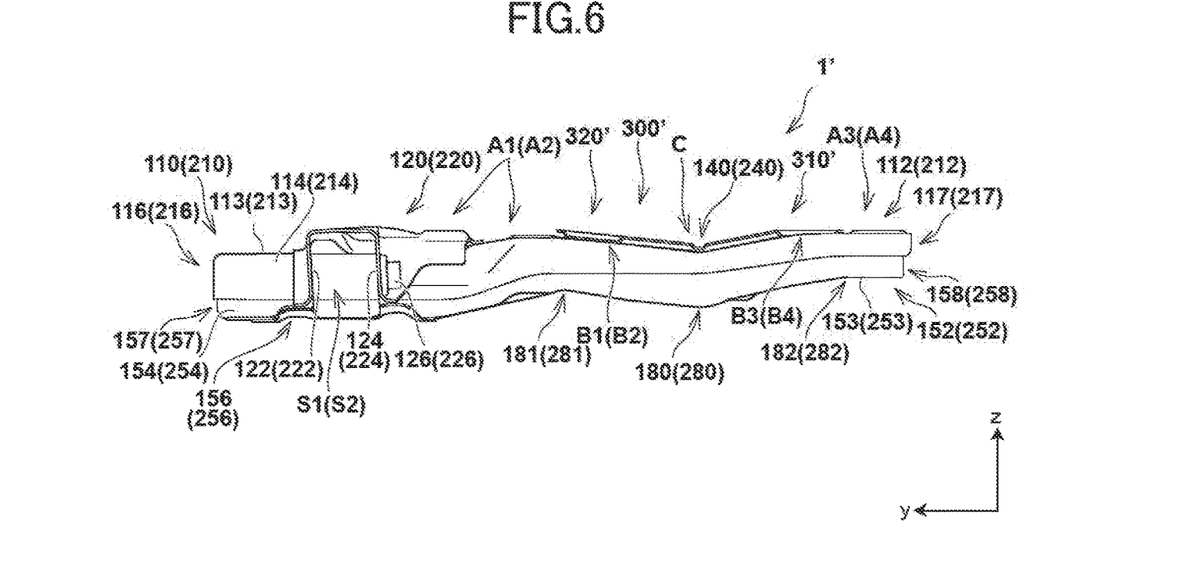
FIG. 6 is a left side view showing a configuration of a vehicle subframe according to a first modification of the embodiment of the preset invention, and corresponds to FIG. 3 in terms of position.

In addition, there are considered various modifications of the vehicle subframe 1 of the present embodiment. First, a main difference in a vehicle subframe 1' in a first modification shown in FIG. 6 is that the configuration of a coupling member 300' is different from the configuration of the coupling member 300 of the vehicle subframe 1 described before. Other parts of the configuration in the vehicle subframe 1' are identical to those in the vehicle subframe 1.

FIG. 6 is a left side view showing a configuration of the vehicle subframe 1' according to the present modification, and corresponds to FIG. 3 in terms of position.

Specifically, as shown in FIG. 6, the coupling member 300' has a shape that is inclined downward in accordance with the degree of inclination of each of the left side member 110 and the right side member 210, as it approaches the crossing portion C from the first coupling portion B1 or the second coupling portion B2, and has a shape that is inclined downward as it approaches the crossing portion C from the third coupling portion B3 or the fourth coupling portion B4. Other parts of the configuration are identical to those of the coupling member 300. Accordingly, it is possible to increase the strength and the rigidity of the vehicle subframe 1' by forming the coupling member 300' as a diagonal bracing structure, and to arrange the fragile portion in the crossing portion C of the coupling member 300' to more effectively prevent the coupling member 300' from unnecessarily affecting deformation modes of the concave portion 140 that is provided in the upper wall portion 113 of the left upper member 112 of the left side member 110 and the concave portion 240 that is provided in the upper wall portion 213 of the right upper member 212 of the right side member 210 when the concave portions 140 and 240 function as fragile portions, thereby allowing deformation of those fragile portions and allowing the vehicle subframe 1' to exhibit a required collision performance. Further, because the coupling member 300 ' is inclined downward, it is possible to ensure a space above the vehicle subframe 1' and to improve the layout property of a peripheral member.

Figure 7:
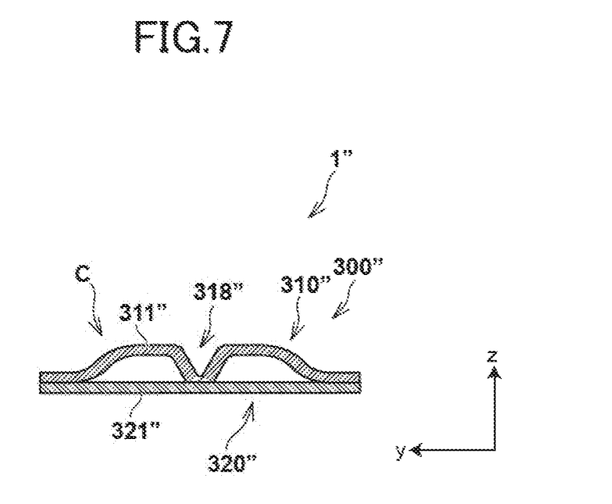
FIG. 7 is a cross-sectional view showing a configuration of a vehicle subframe according to a second modification of the embodiment of the preset invention, and corresponds to FIG. 4A in terms of position.

In addition, a main difference in a vehicle subframe 1" in a second modification shown in FIG. 7 is that the configuration of a coupling member 300" is different from the configurations of the coupling members 300 and 300' of the vehicle subframes 1 and 1' described before. Other parts of the configuration in the vehicle subframe 1" are identical to those in the vehicle subframes 1 and 1".

FIG. 7 is a cross-sectional view showing a configuration of the vehicle subframe 1" according to the present modification, and corresponds to FIG. 4A in terms of position. Specifically, as shown in FIG. 7, in the coupling member 300", a main body 311" of a first coupling member 310" is apart from a main body 321" of a second coupling member 320" upward in the crossing portion C to form a hat-section, instead of the through holes 317 and 327 being provided. In addition, the coupling member 300" has a concave portion 318" in which the main body 311" is concave downward over the width direction in an intermediate portion in the front-rear direction in the crossing portion C, as a fragile portion. Other parts of the configuration of the coupling member 300" are identical to those of the coupling members 300 and 300'. Accordingly, it is possible to increase the strength and the rigidity of the vehicle subframe 1" by forming the coupling member 300" as a diagonal bracing structure. Also, it is possible to arrange the fragile portion in the crossing portion C of the coupling member 300" to more effectively prevent the coupling member 300" from unnecessarily affecting deformation modes of the concave portion 140 that is provided in the upper wall portion 113 of the left upper member 112 of the left side member 110 and the concave portion 240 that is provided in the upper wall portion 213 of the right upper member 212 of the right side member 210 when the concave portions 140 and 240 function as fragile portions, thereby allowing the vehicle subframe 1" to exhibit a required collision performance while allowing the deformation of those fragile portions.

In the present invention, the types, shapes, arrangements, numbers, and the like of the constituent members are not limited to those in the above embodiment, and it is needless to mention that the constituent elements can be modified as appropriate without departing from the scope of the invention, such as appropriately replacing these constituent elements with other members having equivalent operational effects.

As described above, in the present invention, it is possible to provide a vehicle subframe capable of increasing the strength and the rigidity and exhibiting a required collision performance. Therefore, because of its general purposes and universal characteristics, applications of the present invention can be expected in a wide range in the field of a subframe of a moving body such as a vehicle.

What is claimed is:

1. A vehicle subframe attached to a vehicle body, comprising:

a first side member and a second side member that extend in a front-rear direction of the vehicle body and are arranged to be opposed to each other in a width direction of the vehicle body;

a cross member that is arranged to extend in the width direction and couples the first side member and the second side member to each other; and a coupling member that is arranged to extend in the width direction to be apart from the cross member toward a rear side of the vehicle body and couples the first side member and the second side member to each other, wherein the coupling member is coupled to the first side member in a left front coupling portion and a left rear coupling portion both of which are located at the first side member to be apart from each other in the front-rear direction, and is coupled to the second side member in a right front coupling portion and a right rear coupling portion both of which are located at the second side member to be apart from each other in the front-rear direction, the first side member has a first fragile portion located at a position intervened between the left front coupling portion and the left rear coupling portion, both of which are located at the first side member, in the front-rear direction, and the second side member has a second fragile portion located at a position intervened between the right front coupling portion and the right rear coupling portion, both of which are located at the second side member, in the front-rear direction.

2. The vehicle subframe according to claim 1, wherein the coupling member has a crossing portion where the coupling member crosses, between the first side member and the second side member, and has a third fragile portion in the crossing portion.

3. The vehicle subframe according to claim 2, wherein the first fragile portion, the second fragile portion, and the third fragile portion are aligned in the width direction to exhibit the same position in the front-rear direction.

4. The vehicle subframe according to claim 3, wherein the first side member further has a fourth fragile portion on a front side in the vehicle body of the left front coupling portion, and a fifth fragile portion on the rear side of the left rear coupling portion, and the second side member further has a sixth fragile portion on the front side of the right front coupling portion and a seventh fragile portion on the rear side of the right rear coupling portion.

5. The vehicle subframe according to claim 2, wherein the third fragile portion is formed as a concave portion that is concave downward in the vehicle body.

6. The vehicle subframe according to claim 2, wherein the coupling member is inclined downward in the vehicle body as the coupling member approaches the crossing portion from the first side member and the second side member.

* * * * *